United States Patent
Lv et al.

(10) Patent No.: US 9,511,578 B2
(45) Date of Patent: Dec. 6, 2016

(54) FILM-REMOVING MECHANISM

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Xiao-Yong Lv, Jiashan (CN); Xiao-Ming Deng, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/521,685

(22) Filed: Oct. 23, 2014

(65) Prior Publication Data
US 2015/0114573 A1 Apr. 30, 2015

(30) Foreign Application Priority Data
Oct. 28, 2013 (CN) .......................... 2013 1 0514287

(51) Int. Cl.
*B32B 38/10* (2006.01)
*B32B 43/00* (2006.01)

(52) U.S. Cl.
CPC .............. *B32B 43/006* (2013.01); *B32B 38/10* (2013.01); *Y10T 156/1137* (2015.01); *Y10T 156/1939* (2015.01)

(58) Field of Classification Search
CPC ................ B32B 38/10; B32B 43/006; Y10T 156/1137; Y10T 156/1168; Y10T 156/1939; Y10T 156/1989

USPC .................................. 156/708, 714, 757, 766
See application file for complete search history.

(56) References Cited

U.S. PATENT DOCUMENTS

| | | | | |
|---|---|---|---|---|
| 8,470,129 B1 * | 6/2013 | Wang | ...................... | B32B 38/10 156/705 |
| 2005/0205204 A1 * | 9/2005 | Kurosawa | ......... | H01L 21/67132 156/716 |
| 2005/0233547 A1 * | 10/2005 | Noda | .................... | B32B 43/006 438/459 |
| 2007/0261783 A1 * | 11/2007 | Larson | ................ | B29C 63/0013 156/247 |
| 2010/0011555 A1 * | 1/2010 | Pedrazzini | ................ | B67B 7/00 29/426.5 |
| 2011/0048641 A1 * | 3/2011 | Sugimura | ............... | B32B 38/10 156/705 |
| 2011/0079354 A1 * | 4/2011 | Barton | ............... | G03G 15/2028 |

(Continued)

FOREIGN PATENT DOCUMENTS

| | | |
|---|---|---|
| CN | 201703001 U | 1/2011 |
| CN | 102756536 A | 10/2012 |
| TW | M264801 | 5/2005 |

*Primary Examiner* — Mark A Osele
*Assistant Examiner* — Nickolas Harm
(74) *Attorney, Agent, or Firm* — Zhigang Ma (57) ABSTRACT

A film-removing mechanism configured to cooperate with a mechanical arm to remove a protecting film from a workpiece can include a base, a blowing member coupled to the base, and a holding assembly positioned adjacent to the blowing member. The base can be configured to support the workpiece. The blowing member defining an air outlet can be configured to communicate with an external air resource. The holding assembly can include a supporting member positioned adjacent to the base and a driving member coupled to the supporting member. The supporting member can correspond to the air outlet and the driving member can be configured to connect to the external mechanical arm.

10 Claims, 6 Drawing Sheets

(56) References Cited

U.S. PATENT DOCUMENTS

| | | | |
|---|---|---|---|
| 2011/0198040 A1* | 8/2011 | Ebata | B65H 41/00 156/750 |
| 2011/0253315 A1* | 10/2011 | George | B32B 43/006 156/718 |
| 2013/0048223 A1* | 2/2013 | Ahn | B32B 38/10 156/718 |
| 2013/0133178 A1* | 5/2013 | Lu | G02F 1/1303 29/592.1 |
| 2013/0206331 A1* | 8/2013 | Ho | B26F 3/004 156/247 |

* cited by examiner

FILM-REMOVING MECHANISM

FIELD

The subject matter herein generally relates to protective films and factory processes.

BACKGROUND

A workpiece can be covered by a protecting film before being machined, and the protecting film should then be removed away from the workpiece. A film-removing mechanism can be used when peeling off the protecting film.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising", when utilized, means "including, but not necessarily limited to"; it specifically indicates open-ended inclusion or membership in the so-described combination, group, series and the like.

A film-removing mechanism functioning with a mechanical arm to remove a protecting film from a workpiece can include a base, a blowing member coupled to the base, and a holding assembly positioned adjacent to the blowing member. The base can be configured to support the workpiece. The blowing member can be coupled to an external air resource, and can define an air outlet thereon. The holding assembly can include a supporting member positioned adjacent to the base and a driving member coupled to the supporting member. The supporting member can correspond to the air outlet and the driving member can be configured to connect to the external mechanical arm. The air outlet is configured to receive a stream of pressurized air from the external air resource and direct the stream towards a corner of the protecting film on the workpiece, in order to cause the corner of the protecting film to be displaced and be attached on the supporting member. The driving member can be configured to cooperate with the supporting member to clamp the protecting film on the supporting member, such that the protecting film can be removed from the workpiece when the external mechanical arm is moved away.

Figure 1:
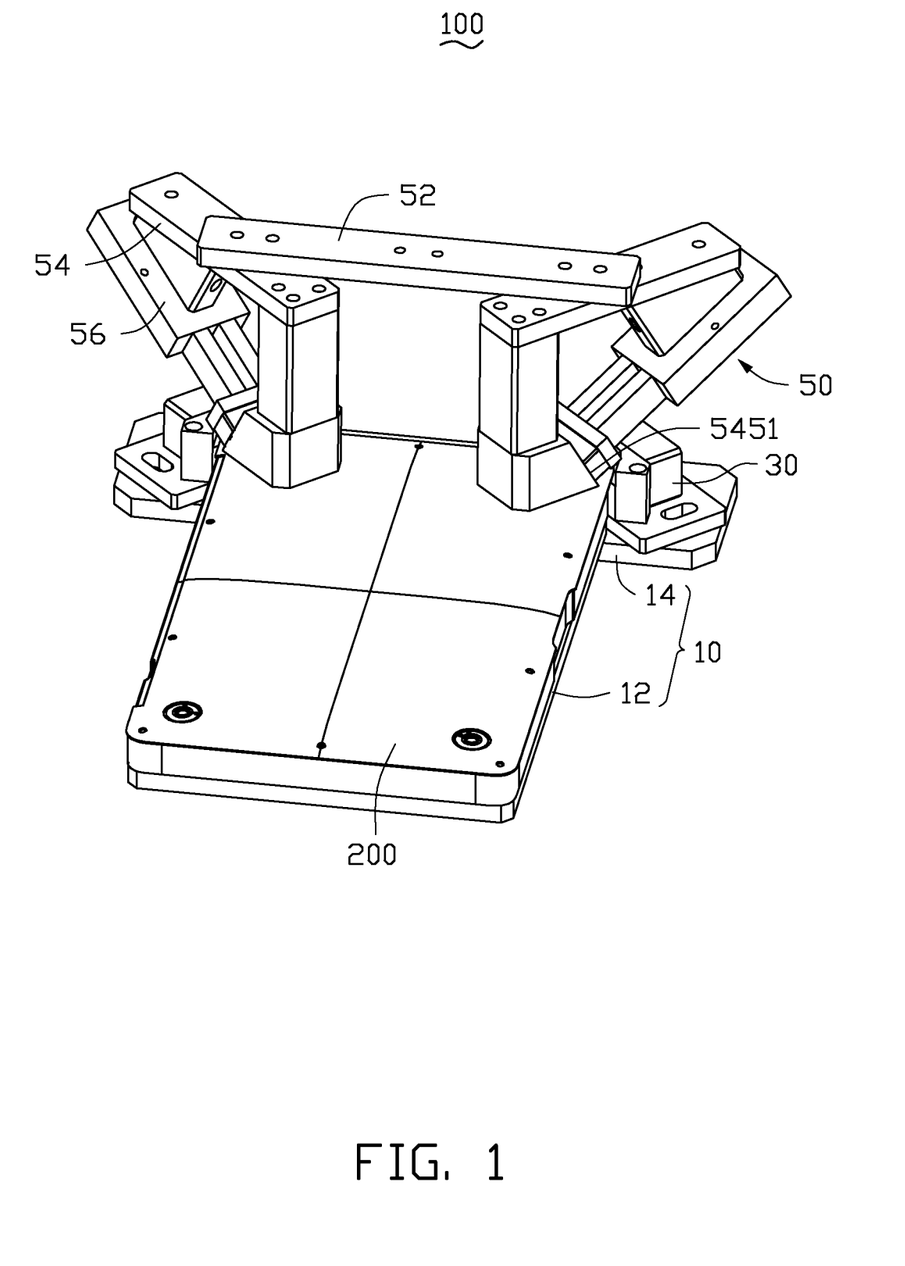
FIG. 1 is an isometric view of a first embodiment of a film-removing mechanism in an operating state, the film-removing mechanism including a blowing assembly and a holding assembly.
Figure 2:
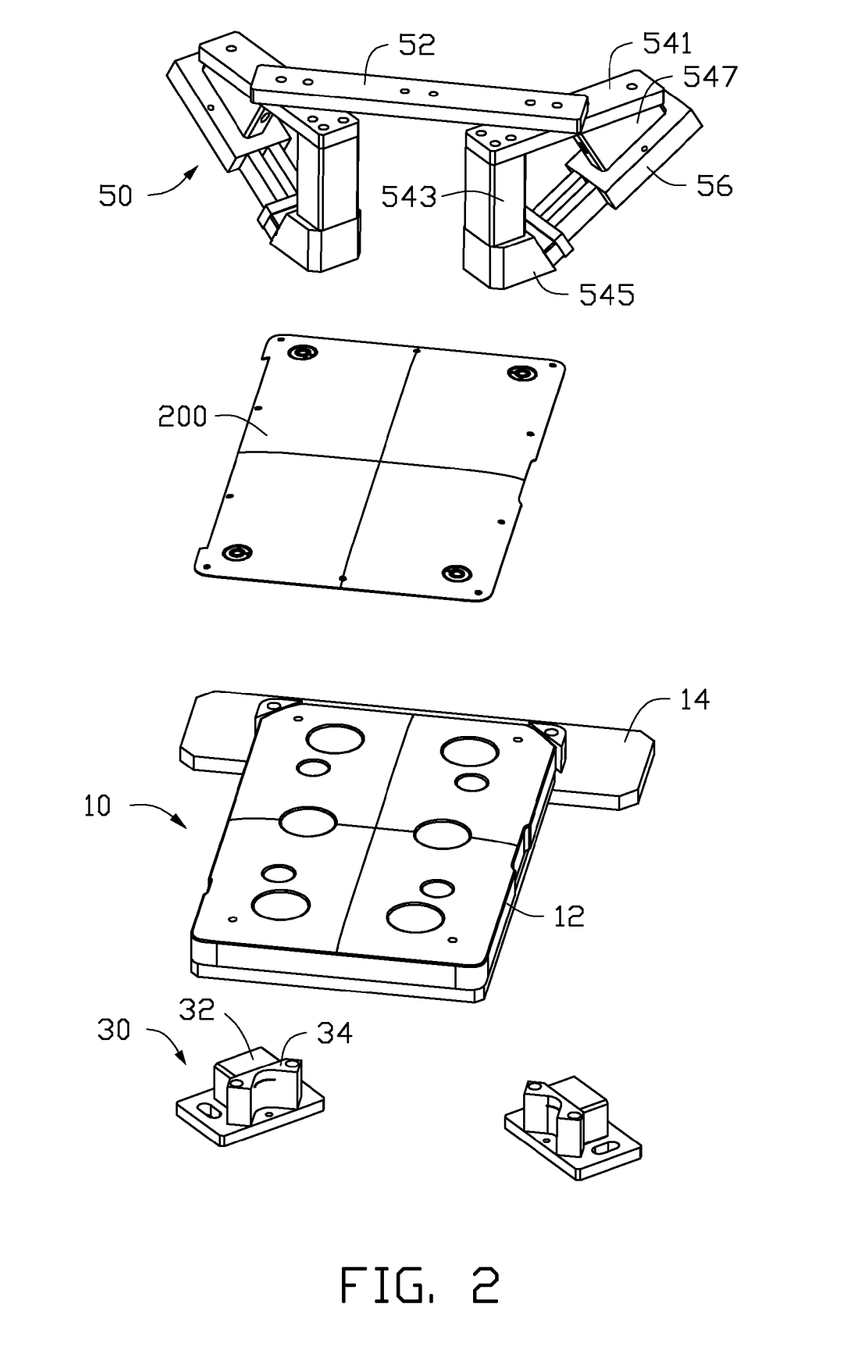
FIG. 2 is an exploded isometric view of the film-removing mechanism of FIG. 1.

FIGS. 1-2 illustrate an embodiment of a film-removing mechanism 100. The film-removing mechanism 100 can cooperate with an external mechanical arm (not shown) to remove a protecting film (not shown) adhered on a workpiece 200. The film-removing mechanism 100 can include a base 10, two blowing assemblies 30 mounted on the base 10, and a holding assembly 50 adjacent to the blowing assemblies 30.

The base 10 can be substantially T-shaped, and can include a basing portion 12 and two connecting portions 14 adjacent to the basing portion 12. The basing portion 12 can be substantially a rectangular plate and configured to support the workpiece 200. A connection portion 14 can be positioned at each of two corners of the basing portion 12. The connecting portions 14 can be configured to support the blowing assemblies 30.

Figure 3:
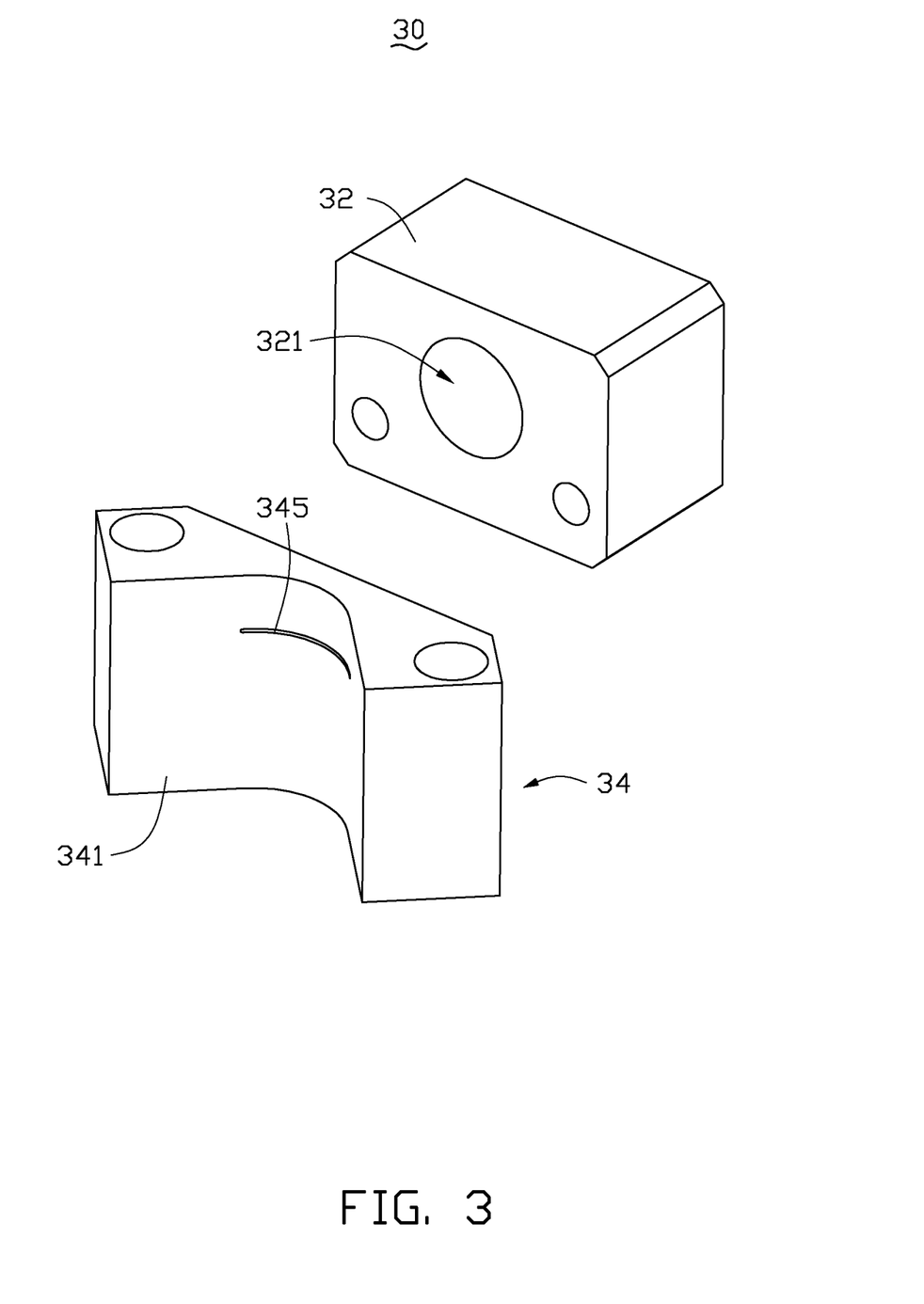
FIG. 3 is an isometric view of the blowing assembly of the film-removing mechanism of FIG. 1.
Figure 4:
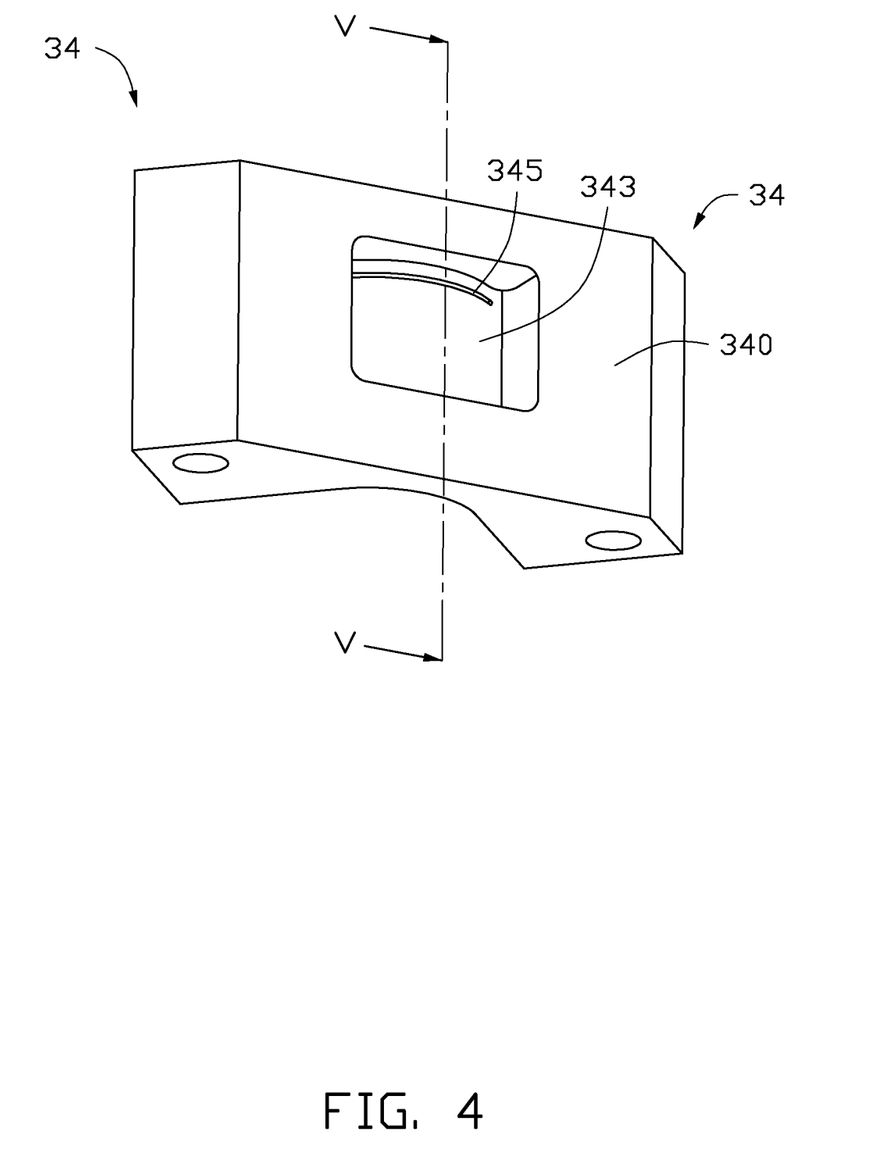
FIG. 4 is similar to FIG. 3, but viewed from another angle.
Figure 5:
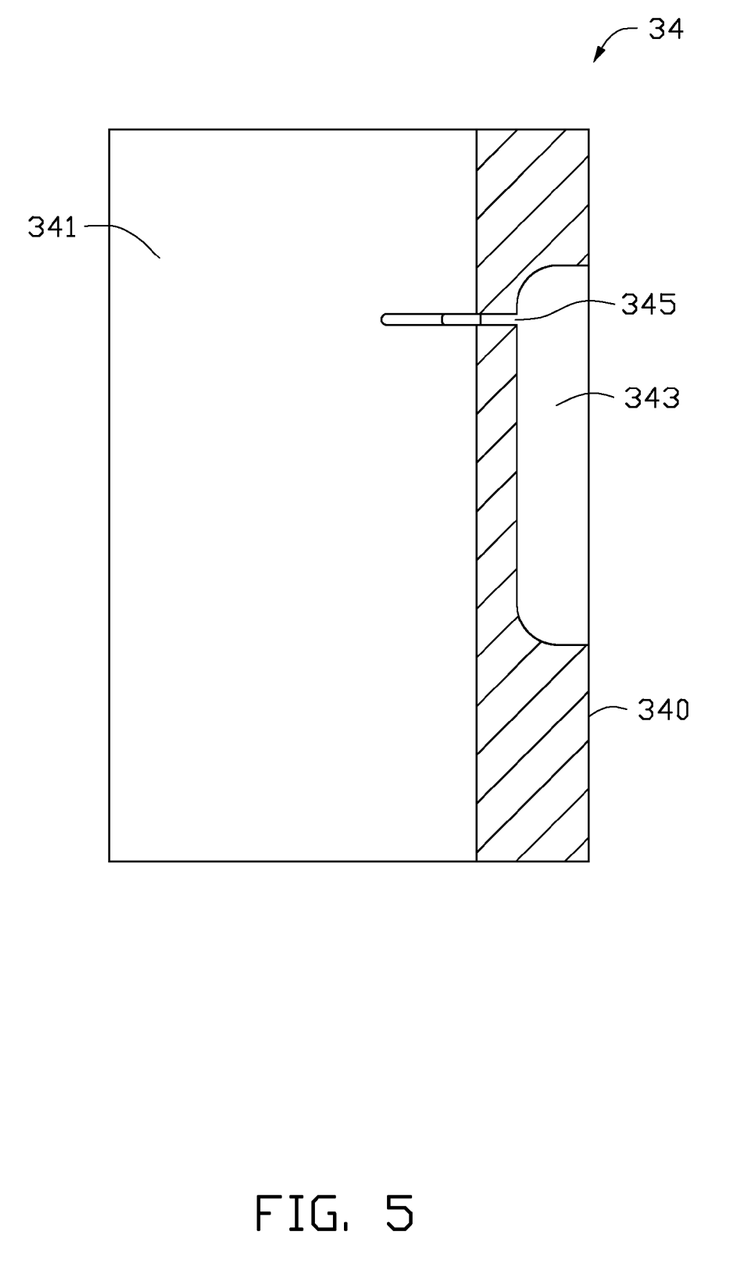
FIG. 5 is a cross sectional view of the blowing assembly taken along line V-V of FIG. 4.

Referring to FIGS. 3-5, the blowing assemblies 30 can be mounted to the connecting portions 14 corresponding to the two corners of the basing portion 12. Each of the blowing assemblies 30 can include a connecting member 32 and a blowing member 34 coupled to the connecting member 32. The connecting member 32 can be substantially a rectangular block and can define an air inlet 321. The air inlet 321 can be configured to communicate with an external air resource (not shown). The blowing member 34 can be stacked on a side of the connecting member 32 adjacent to the basing portion 12, and can be hermetically coupled to the connecting member 32. The blowing member 34 can include a mounting surface 340 facing the connecting member 32, and a resisting surface 341 away from the connecting member 32. The mounting surface 340 can be substantially a flat surface, and can be formed adjacent to the connecting member 32. The resisting surface 341 can be positioned adjacent to a corner of the basing portion 12 and facing the basing portion 12. In the illustrated embodiment, the resisting surface 341 can be substantially a concavity, such that the resisting surface 341 can resist against a corner of the workpiece 200 on the basing portion 12.

The blowing member 34 can define a pressing slot 341 and an air outlet 345 thereon. The pressing slot 341 can be defined on the mounting surface 340 corresponding to the air inlet 321. The air outlet 345 can be defined at a bottom surface of the pressing slot 341, and can extend to the resisting member 341 through the blowing member 34. The air outlet 345 can communicate with the air inlet 321 via the pressing slot 343. The air outlet 345 can be a narrow hole, and can extend substantially parallel to a top surface of the workpiece 200 which is covered by a protecting film, when the the workpiece 200 is facing a corner of the workpiece 200. A width of the air outlet 345 can be 0.45 mm or less, enabling a jet of air at high-pressure to blow through and towards the workpiece 200, such that a corner of the protecting film on the workpiece 200 can be lifted by the air flow.

Figure 6:
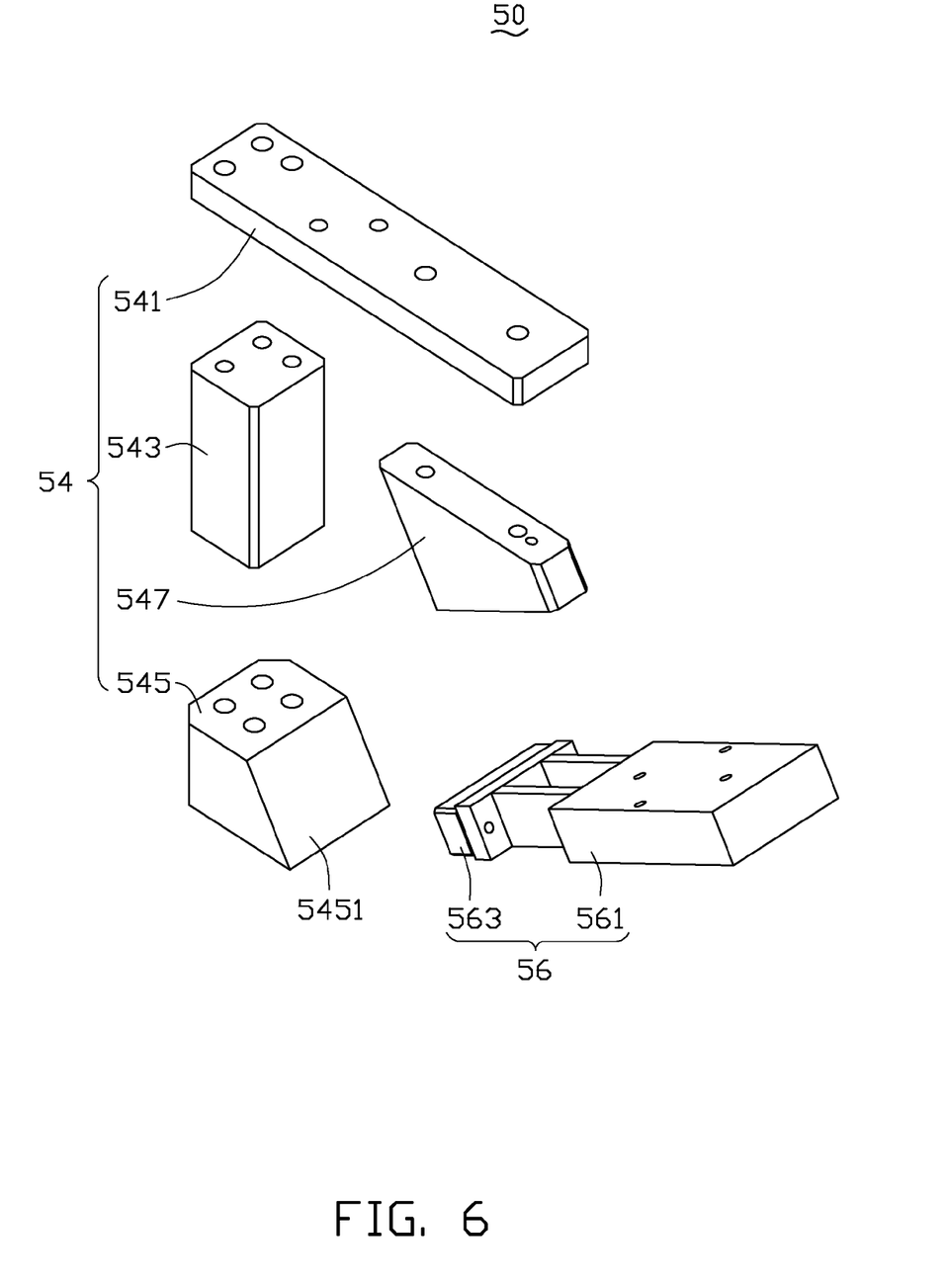
FIG. 6 is an exploded isometric view of the holding assembly of the film-removing mechanism of FIG. 2.

Referring to FIG. 6, the holding assembly 50 can include a mounting member 52, two supporting members 54 coupled to the mounting member 52, and two driving members 56 coupled to the supporting members 54.

The mounting member 52 can be substantially a narrow plate, and can be configured to connect to the external mechanical arm (not shown), such that the film-removing mechanism 100 can cooperate with the external mechanical arm to remove the protecting film from the workpiece 200. In an alternative embodiment, the mounting member 52 can be omitted, such that the supporting members 54 can be directly mounted to the external mechanical arm.

The two supporting members 54 can be respectively mounted at opposite ends of the mounting member 52, corresponding to the two blowing members 30 respectively. Each of the supporting members 54 can be substantially an L-shaped block and can include a first connecting portion 541, a second connecting portion 543, a supporting potion 545, and a mounting portion 547.

The first connecting portion 541 can be substantially a narrow plate and mounted to a side of the mounting member 52 facing the base 10. The second connecting member 543 can be substantially a monolithic block perpendicularly mounted to an end of the first connecting member 541 adjacent to the basing portion 52. The supporting portion 545 can be mounted to an end of the second connecting member 543 away from the first connecting member 541 to correspond to the blowing member 34. The supporting member 545 can include a supporting surface 5451 facing the resisting surface 341. The supporting surface 5451 can be configured to support the corner of the protecting film which is lifted by the high-pressure air jet. The mounting portion 547 can be mounted to an end of the first connecting portion 541 away from the second connecting portion 543.

The driving member 56 can be mounted to the mounting portion 546, and can include a driving portion 561 and a clamping portion 563 coupled to the driving portion 563.

In at least one embodiment, the driving portion 561 can be a cylinder. The clamping portion 563 can be mounted to an end of the driving portion 561 adjacent to the supporting portion 545. The driving portion 561 can be configured to move the clamping portion 563 to resist against the supporting surface 5451, such that a corner of the protecting film on the supporting surface 5451 is thereby clamped.

In alternative embodiments, the driving portion 561 can be other structures. For example, the driving portion 561 can be a four-bar mechanism, or a cam-linkage mechanism driven by a motor, or a screw-nut mechanism, but the actual structure is not limited thereto. The driving portion 561 must be able to move the clamping portion 563 to resist against the supporting surface 5451. Furthermore, in another embodiment, the clamping portion 563 can be a pressing clamp coupled to the supporting portion 545, such that the clamping portion 563 can be configured to resist against the supporting surface 5451 to cooperate with the supporting portion 545 to clamp one corner of the protecting film.

In operation, the base 10 can be mounted to a workbench (not shown), and the mounting member 52 can be mounted to the external mechanical arm. The workpiece 200 can be fixed to the basing portion 12 so that two corners of the workpiece 200 can correspond to the two air outlets 3435. The mechanical arm can move the holding assembly 50 to resist against a top surface of the workpiece 200. The top surface can be covered by a protecting film. The two supporting surfaces 5451 can correspond to the two resisting surfaces 341. The blowing assemblies 30 can be coupled to an external air resource, and high-pressure air through the air inlets 321 and the pressing slots 343 can blow out from the air outlets 345 towards the protecting film. Two corners of the protecting film can be lifted by the air flow and be attached on the supporting surface 5451. The driving portion 561 can move the clamping portion 563 to resist against the supporting surface 5451 such that a corner of the protecting film can be clamped between a clamping portion 563 and a supporting portion 545. The mechanical arm can move the holding assembly 50 away from the workpiece 200, also removing the protecting film from the workpiece 200.

In an alternative embodiment, there can be one mounting member 52, one blowing assembly 30, one supporting member 54, and one driving member 56 such that when the blowing assembly 30 lifts one corner of the protecting film, the supporting member 54 and the driving member 56 can cooperate to clamp the lifted corner of the protecting film.

In an alternative embodiment, the connecting member 32 can be omitted, the blowing member 34 being directly coupled to the external air resource and the pressing slot 343 communicating directly with the external air resource.

In an alternative embodiment, the pressing slot 343 can be omitted when the air outlet 345 will communicate directly with the external air resource via the air inlet 321, to enable the high-pressure air flow to blow through the air inlet 321 and the air outlet 345.

In an alternative embodiment, the shape or profile of the resisting surface 341 can be other shapes. For example, when the top surface of the workpiece 200 is circular, the resisting surface 341 can be cylindrical.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure, as defined by the appended claims.

What is claimed is:

1. A film-removing mechanism configured to cooperate with an external mechanical arm to remove a protecting film from a workpiece, the film-removing mechanism comprising:
   a base configured to support the workpiece;
   a blowing member coupled to the base and configured to communicate with an external air resource, the blowing member having an air outlet, and
   a holding assembly adjacent to the blowing member, the holding assembly comprising:
      a supporting member adjacent to the base and facing the air outlet; and
      a driving member coupled to the supporting member, and configured to connect to the external mechanical arm,
   wherein, the air outlet is configured to receive a stream of pressurized air from the external air resource and direct the stream towards a corner of the protecting film on the workpiece in order to lift the corner of the protecting film from the workpiece and attach the corner of the protecting film to the supporting member; and the driving member is configured to cooperate with the supporting member to clamp the protecting film on the supporting member, such that the external mechanical arm is enabled to move the holding assembly away from the workpiece and thereby remove the protecting film from the workpiece.

2. The film-removing mechanism of claim 1, wherein a width of the air outlet is less than or equal to about 0.45 mm.

3. The film-removing mechanism of claim 1, wherein the blowing member further defines a pressing slot at a surface thereof away from the base, the pressing slot communicates with the air outlet, the air outlet communicates with the external air resource via the pressing slot.

4. The film-removing mechanism of claim 1, wherein the film-removing mechanism further comprises a connecting member coupled to the blowing member, the connecting member defines an air inlet thereon, the air outlet communicates with the external air resource via the air inlet.

5. The film-removing mechanism of claim 1, wherein the holding assembly further comprises a mounting member, the supporting member is coupled to the mounting member and connected to the external mechanical arm via the mounting member.

6. The film-removing mechanism of claim 5, wherein the supporting member comprises a first connecting portion coupled to the mounting member and a mounting portion coupled to the first connecting portion, the driving member is coupled to the mounting portion.

7. The film-removing mechanism of claim 6, wherein the supporting member further comprises a second connecting portion coupled to the first connecting portion and a supporting portion coupled to the second connecting portion, the supporting portion comprises a supporting surface facing the air outlet, the driving member is configured to cooperate with the supporting surface to clamp the protecting film on the supporting member.

8. The film-removing mechanism of claim 1, wherein the driving member comprises a driving portion coupled to the supporting member and a clamping member coupled to the driving portion, the driving portion is configured to move the clamping portion to resist against the supporting member.

9. The film-removing mechanism of claim 8, wherein the driving portion is a cylinder.

10. The film-removing mechanism of claim 1, wherein the base comprises a basing portion configured to support the workpiece and a connecting portion adjacent to the basing portion, the blowing member is coupled to the connecting portion.

* * * * *